United States Patent
Dearmond

(10) Patent No.: US 10,016,851 B1
(45) Date of Patent: Jul. 10, 2018

(54) CLAMPING APPARATUS FOR A LEVEL

(71) Applicant: Keith C Dearmond, Silver Springs, FL (US)

(72) Inventor: Keith C Dearmond, Silver Springs, FL (US)

( * ) Notice: Subject to any disclaimer, the term of this patent is extended or adjusted under 35 U.S.C. 154(b) by 0 days.

(21) Appl. No.: 15/609,007

(22) Filed: May 30, 2017

(51) Int. Cl.
| | |
|---|---|
| *B23K 37/04* | (2006.01) |
| *B25B 5/14* | (2006.01) |
| *B25B 5/08* | (2006.01) |
| *G01C 9/28* | (2006.01) |
| *G01C 9/34* | (2006.01) |

(52) U.S. Cl.
CPC .......... *B23K 37/0435* (2013.01); *B25B 5/082* (2013.01); *B25B 5/14* (2013.01); *G01C 9/28* (2013.01); *G01C 9/34* (2013.01)

(58) Field of Classification Search
CPC .... F16B 2/06; G01C 9/26; G01C 9/28; F16M 11/041; F16M 11/045; F16M 11/105; F16M 11/10; B25B 5/003; B25B 5/101
See application file for complete search history.

(56) References Cited

U.S. PATENT DOCUMENTS

| | | | |
|---|---|---|---|
| 1,093,775 A | 4/1914 | Frantz | |
| 1,345,177 A * | 6/1920 | Heckathorn | B25B 5/003 269/64 |
| 1,987,826 A * | 1/1935 | Heumann | B25B 5/003 211/182 |
| 2,636,527 A * | 4/1953 | Schiemann | B25B 5/003 269/249 |
| 2,945,713 A * | 7/1960 | Sears | E04G 7/24 403/164 |
| 4,066,232 A * | 1/1978 | Hermeyer | G01C 9/28 248/231.51 |
| 4,394,799 A * | 7/1983 | Moree | G01C 9/28 33/343 |
| 4,566,819 A * | 1/1986 | Johnston | E04G 7/14 403/385 |
| 4,829,676 A * | 5/1989 | Waldron | G01C 9/28 33/372 |
| 4,903,929 A * | 2/1990 | Hoffman | B25B 5/101 24/335 |
| 5,188,327 A * | 2/1993 | White | F16B 12/54 248/231.81 |
| 5,309,645 A * | 5/1994 | Hoffmeyer | G01C 9/28 33/354 |
| 5,326,059 A * | 7/1994 | Pryor | F16M 11/08 248/230.6 |
| 5,408,752 A * | 4/1995 | Eadens | G01C 9/26 33/376 |
| 5,507,098 A * | 4/1996 | Schaver, Jr. | H02G 1/00 33/347 |
| 5,581,900 A | 12/1996 | Payne | |
| 5,584,458 A | 12/1996 | Rando | |
| 5,605,312 A * | 2/1997 | Elder | F16M 13/022 248/229.26 |
| 5,749,151 A | 5/1998 | Scott et al. | |
| 5,799,404 A | 9/1998 | Payne | |

(Continued)

*Primary Examiner* — Christopher M Koehler
*Assistant Examiner* — Seahee Yoon
(74) *Attorney, Agent, or Firm* — Chris Tanner, Esq.; FYPA, PLLC

(57) ABSTRACT

The invention provides a clamping system that includes a vise and a cooperating level holder to facilitate a wide range of options for positioning a level with respect to a structural member.

8 Claims, 13 Drawing Sheets

(56) References Cited

U.S. PATENT DOCUMENTS

| | | | | |
|---|---|---|---|---|
| 5,815,937 | A | 10/1998 | Glorioso, Jr. | |
| 5,819,425 | A | 10/1998 | Payne | |
| 6,004,063 | A * | 12/1999 | Adams, Sr. | F16B 7/185 |
| | | | | 403/170 |
| 6,502,322 | B2 | 1/2003 | Smochek | |
| 6,640,456 | B2 | 11/2003 | Owoc et al. | |
| 7,147,398 | B2 * | 12/2006 | Liew | E04G 7/14 |
| | | | | 403/169 |
| 7,520,065 | B2 | 4/2009 | Vernola | |
| 8,061,051 | B2 | 11/2011 | Allemand | |
| 8,403,280 | B2 * | 3/2013 | Halverson | F16M 13/02 |
| | | | | 248/228.5 |
| 2002/0061225 | A1 * | 5/2002 | Boucher | F16B 2/185 |
| | | | | 403/386 |
| 2005/0120572 | A1 | 6/2005 | Valenti | |
| 2006/0123644 | A1 * | 6/2006 | Szumer | G01C 9/28 |
| | | | | 33/374 |
| 2006/0137200 | A1 * | 6/2006 | Lollar | G01C 9/00 |
| | | | | 33/371 |
| 2008/0235967 | A1 * | 10/2008 | Gentleman | G01C 9/28 |
| | | | | 33/372 |
| 2009/0229136 | A1 * | 9/2009 | Howard | G01C 9/26 |
| | | | | 33/301 |
| 2010/0171007 | A1 * | 7/2010 | Doll | F16M 13/022 |
| | | | | 248/125.7 |
| 2011/0146091 | A1 | 6/2011 | Spaulding | |
| 2013/0277517 | A1 * | 10/2013 | Wright | A45D 20/12 |
| | | | | 248/231.81 |
| 2014/0075769 | A1 | 3/2014 | Swisher et al. | |
| 2014/0283462 | A1 * | 9/2014 | Zhang | F16B 37/0885 |
| | | | | 52/70 |

\* cited by examiner

CLAMPING APPARATUS FOR A LEVEL

BACKGROUND

Field of Invention

The invention relates generally to a clamping apparatus. More specifically, but not by way of limitation, embodiments of the invention provide cooperating clamping apparatuses to removably secure a level to a measured surface.

Description of the Related Art

A level is used in carpentry and other construction trades. As used herein, a level is a tool used to indicate whether a surface is level (i.e., horizontal) or plumb (i.e., vertical) and/or to provide a measure of offset from such states (i.e., inclination or tilt). Conventional levels include a sealed tube disposed in a rectangular frame. The tube contains a liquid and an air bubble. When the frame is held against a structural surface, an orientation of the tube within the frame and a position of the bubble within the tube provide a visual indication of levelness or plumbness of the surface. The frame is typically fabricated from wood, metal, or plastic; in the U.S., frame lengths of 9, 12, 24, 48, 72, and 78 inches are typical. Electronic levels also generally include a rectangular frame as described above, but may use alternative technologies to measure and/or display inclination instead of, or in combination with, one or more conventional bubble indicators.

In use, a user manually positions and holds a long side of the level frame against a surface(s) being measured. Because repeated assessments may be required with respect to any measured surface, repositioning the level on the surface can be time consuming and tedious. Clamps have been developed to temporarily secure a level to a measured surface. Known clamps have a significant shortcoming, however, because they restrict a relative position between the level and the measured surface. More flexible clamping devises are needed.

SUMMARY OF THE INVENTION

The invention seeks to overcome the shortcoming described above by providing a clamping system that includes a vise and a cooperating level holder to facilitate a wide range of alternative positional configurations.

An embodiment of the invention provides a clamping system for use with a level. The clamping system includes: a level holder having a 4-sided sleeve, a first clip being disposed on a first side of the sleeve and a second clip being disposed on a second side of the sleeve, the first side of the sleeve being orthogonal to the second side of the sleeve; and a vise having an angle member coupled to a movable jaw, a first receiver being disposed on a first side of the angle member and a second receiver being disposed on a second side of the angle member, the first side of the angle member being orthogonal to the second side of the angle member, each of the first and second clips configured to cooperate with each of the first and second receivers such that the level holder can be removably connected to the vise using a selected one of the first and second clips and a selected one of the first and second receivers.

DESCRIPTION OF THE DRAWINGS

An embodiment of the invention is illustrated in the drawings, wherein:

FIG. 7 is a side view

DETAILED DESCRIPTION

Figure 1:
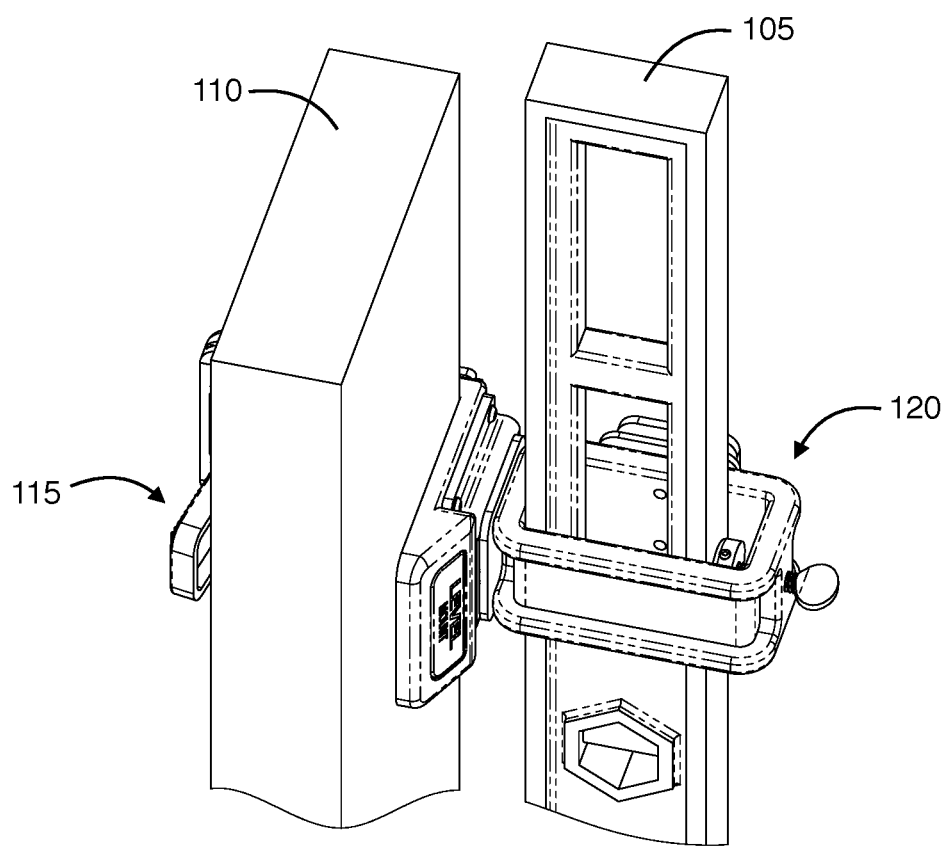
FIG. 1 is a perspective view of a clamping system, according to an embodiment of the invention.

This section describes embodiments of the invention with reference to FIGS. 1-25. Such embodiments are meant to be illustrative and not restrictive. In the drawings, reference designators are reused for the same or similar features.

Features in the figures are not necessarily drawn to scale. Some features illustrated in the drawings may be exaggerated in scale. Other features may be simplified, omitted, or not specifically referenced for descriptive clarity. The following paragraphs provide an overview of a clamping system, describe features of a vise and a level holder included in the clamping system, and provide exemplary applications for one or more clamping systems.

Overview

FIG. 1 is a perspective view of a clamping system, according to an embodiment of the invention. As shown therein, a level 105 is removably secured to a structural member 110 via a vise 115 and level holder 120. Couplings between the level 105 and the level holder 120, the structural member 110 and the vise 115, and between the vise 115 and the level holder 120 are intended to be temporary. But one or more such couplings could be maintained on a more permanent basis, according to application needs.

Clamping Features

Figure 2:
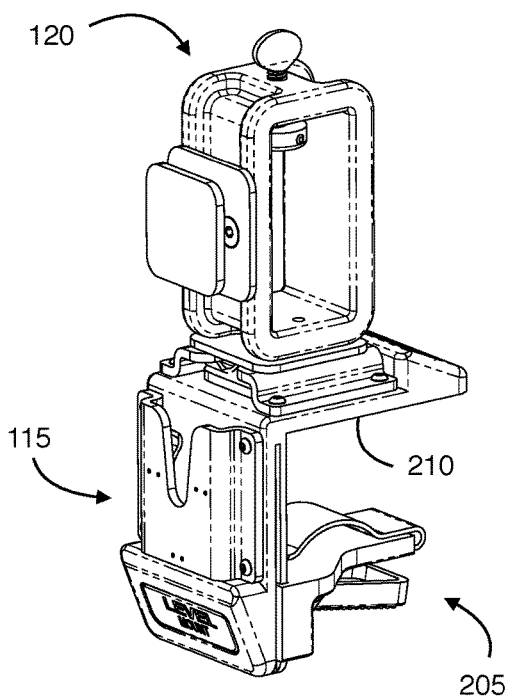
FIG. 2 is a perspective view of a clamping system showing a movable jaw in a first position, according to an embodiment of the invention.
Figure 3:
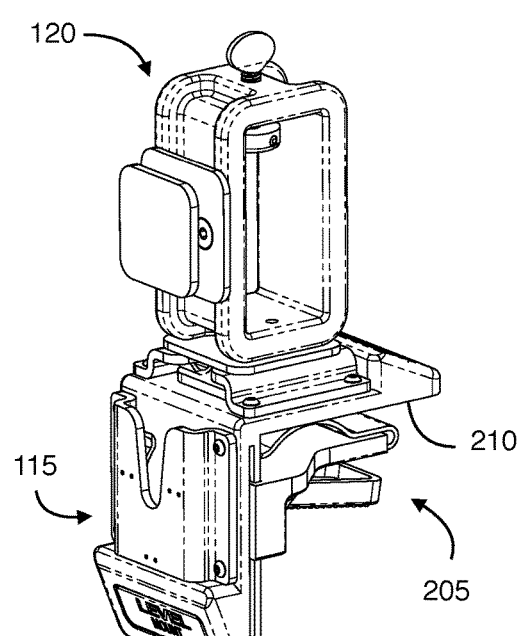
FIG. 3 is a perspective view of a clamping system showing a movable jaw in a second position, according to an embodiment of the invention.

As used herein, a vise is broadly defined as a clamp. In embodiments of the invention, a feature of the vise 115 is that it can grip a structural member 110 between a movable jaw 205 and an opposing surface of an angle member 210. FIG. 2 illustrates the movable jaw 205 in a relatively open portion; FIG. 3 illustrates the movable jaw 205 in a relatively closed position. Many intermediate clamping positions for the movable jaw 205 are also possible, as will be apparent from the description below.

Figure 4:
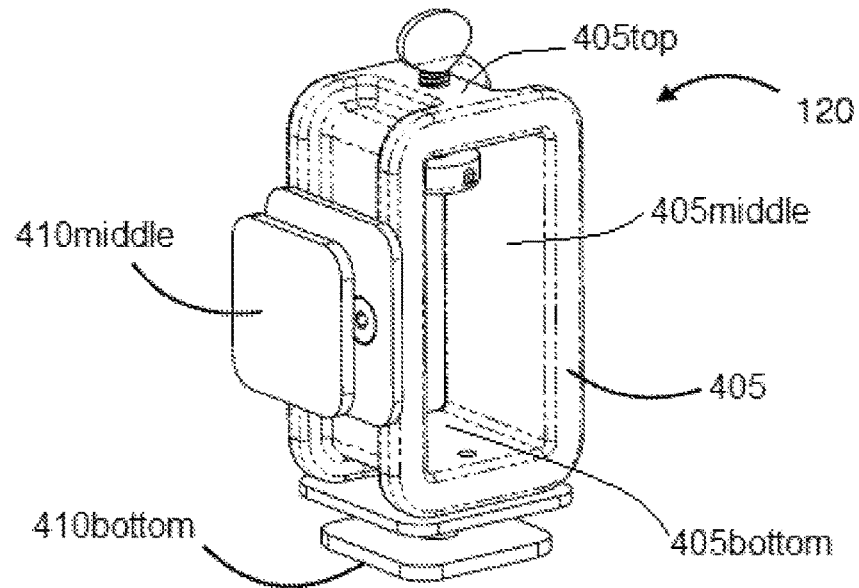
FIG. 4 is a perspective view of a level holder, according to an embodiment of the invention.
Figure 5:
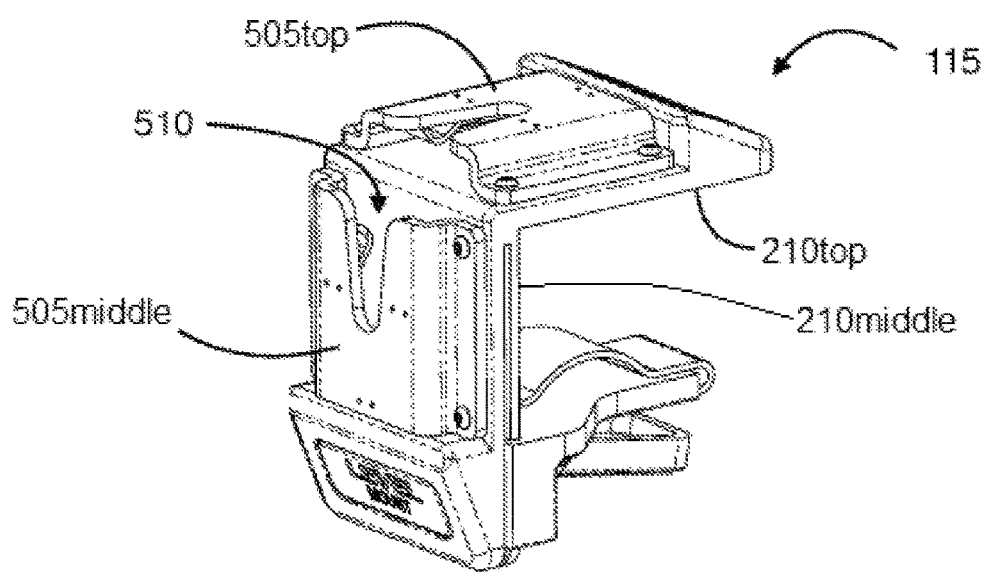
FIG. 5 is a perspective view of a vise, according to an embodiment of the invention.

FIGS. 4 and 5 separately illustrate the level holder 1220 and vise 115, respectively. The level holder 120 includes a 4-sided, substantially rectangular, sleeve 405 comprising a top portion 405top, two middle portions 405middle, and a bottom portion 405bottom. The sleeve 405 is preferably sized to cooperate with cross-sectional dimensions of a target level 105. The level holder 120 is configured to claim the level 105 at any location along the length of the level 105, and is preferably sized to cooperate with alternative levels 105 having different lengths. A first clip 410 (e.g. 410middle in FIG. 4) is fixed to a first exterior side of the sleeve 405. A second clip 410 (e.g. 410bottom in FIG. 4) is fixed to a second exterior side of the sleeve 405. The first and the second sides of the sleeve 405 are orthogonal.

The vise 115 includes a first retainer 505 (e.g. 505top in FIG. 5) fixed to a first exterior side (e.g. 210top in FIG. 5) of the angle member 210. A second retainer 505 (e.g. 505middle in FIG. 5) is fixed to a second exterior side (e.g. 210middle in FIG. 5) of the angle member 210. The first and the second sides of the angle member 210 are orthogonal.

Each of the clips 410 is configured to cooperate with each of the retainers 505. In the illustrated embodiment, a post 630 (visible in FIGS. 6, 7A, and 7B) on the clip 410 cooperates with a slot 510 in the retainer 505. The clip 410 also cooperates with the tension springs 905 (best illustrated in FIG. 9) in the retainer 505.

A coupling between any one of the clips 410 and any one of the retainers 505 will removably couple the level holder 120 to the vise 115. Moreover, in the illustrated embodiment, a selected one of the clips 410 can be disposed in any one of 4 rotational positions with respect to a selected one of the retainers 505 when coupled. Accordingly, the disclosed clamping system advantageously enables 16 alternative configurations that includes a level holder 120 mated to a vise 115. The drawings illustrate several, but not all 16, alternative coupling configurations.

Figures 6, 7A:
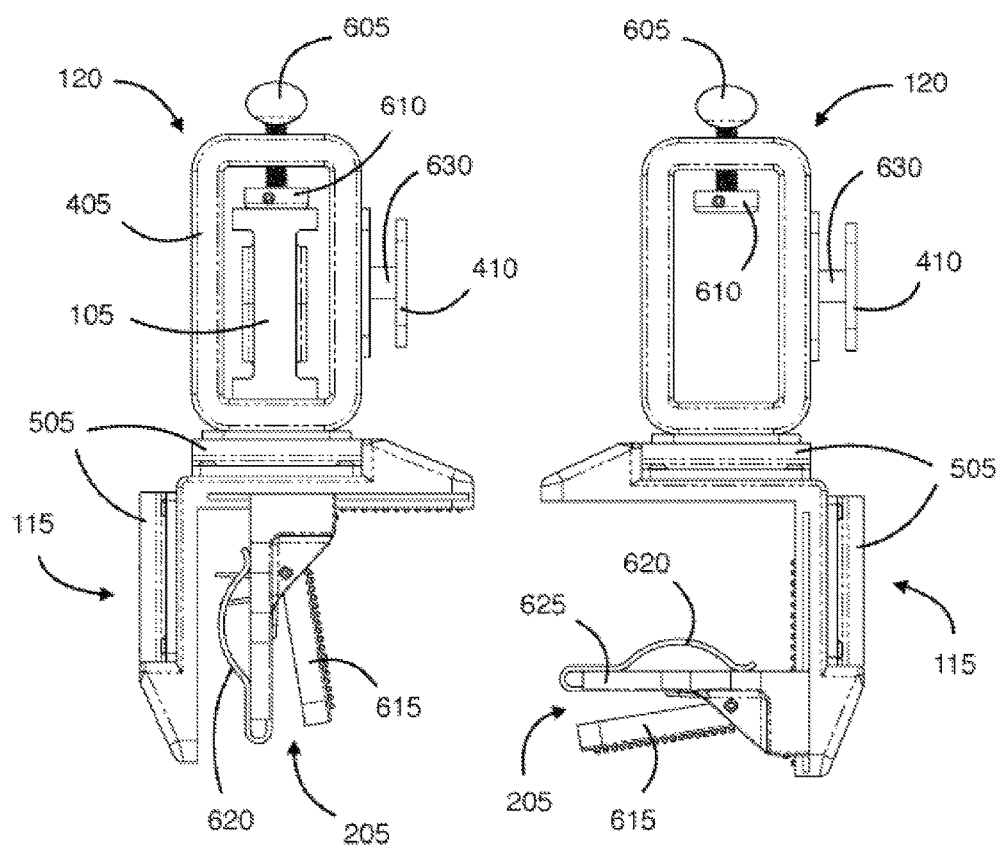
FIG. 6 is a side view of a clamping system in a first configuration, according to an embodiment of the invention.
FIGS. 7A and 7B are side views of a clamping system in a second configuration, according to an embodiment of the invention.
Figure 7B:
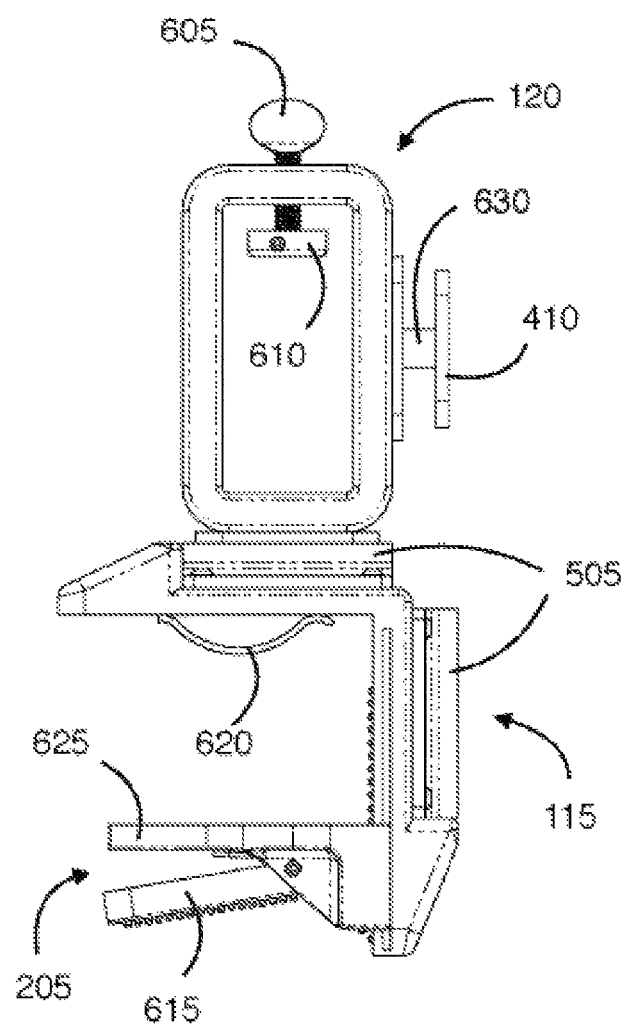

In one respect, FIGS. 6 and 7 illustrate two alternative clamping system configurations: the configuration shown in FIG. 6 uses a different one of the retainers 505 than the configurations shown in FIGS. 7A and 7B to couple the level holder 120 to the vise 115.

FIGS. 6, 7A, and 7B also identify certain additional features. For instance it can be seen that, in the illustrated embodiment, level holder 120 includes a thumb screw 605 threaded into the sleeve 405 and coupled to a foot 610 to retain the level. In addition, pivot arm 615, flat spring 620, and plate 625 are identified as components of the movable jaw 205. The pivot arm 615 facilitates ratcheting adjustment of the movable jaw 205, together with other components described below; the flat spring 620 and plate 625 provide gripping structure. Advantageously, in the embodiment where the flat spring 620 is disposed on a gripping surface of the movable jaw 205, adjustments of the movable jaw 205 on the vise 115 (e.g. via ratcheting and/or release action) may not be required during engagement or disengagement with a structural member 110 in some applications.

In alternative embodiments, clamping hardware configurations that achieve the same result described herein could be substituted. For example, in the level holder 120, a spring-loaded plunger or a cam wheel could be used in place of the thumb screw 605 to retain the level 105 within the sleeve 405. In alternative embodiments of the invention, the vise 115 could use a threaded screw mechanism in place of the ratcheting adjustment features. For instance, a threaded screw c-clamp could be used as a vise 115 to facilitate coupling to a structural member 110. In alternative embodiments, a flat spring 620 could be disposed on a gripping surface of the angle member 210 instead of, or in addition to, the flat spring 620 that is disposed on a gripping surface of the movable jaw 205. In other embodiments, the flat spring 620 could be omitted altogether.

Figure 8:
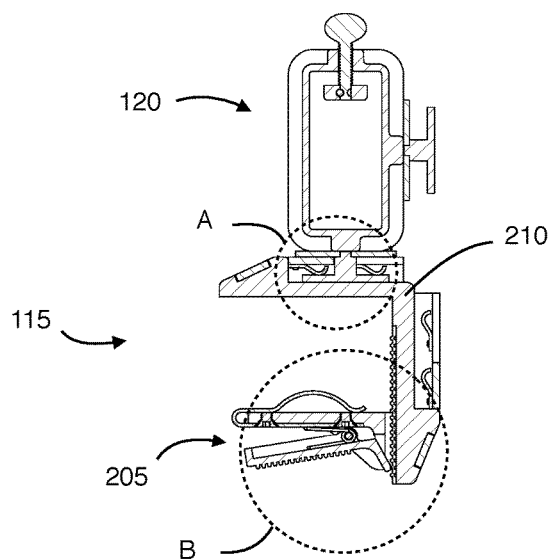
FIG. 8 is a sectional view of a clamping system, according to an embodiment of the invention.
Figure 9:
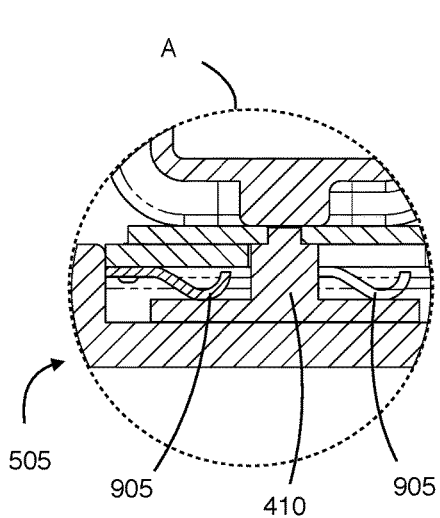
FIG. 9 is a detailed sectional view of portion A in FIG. 8.
Figure 10:
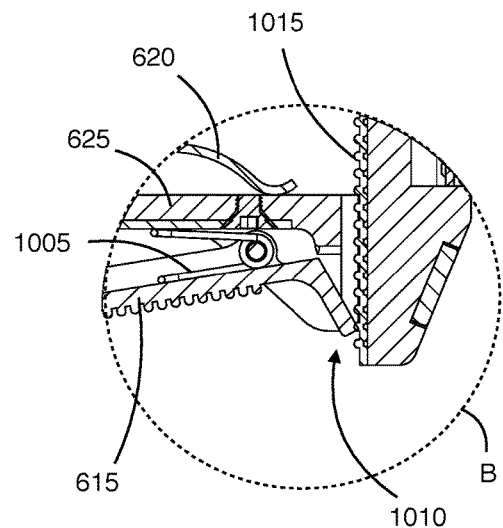
FIG. 10 is a detailed sectional view of portion B in FIG. 8.

FIG. 8 is a sectional view of a clamping system, according to an embodiment of the invention. FIG. 9 is a detailed sectional view of portion A in FIG. 8; FIG. 10 is a detailed sectional view of portion B in FIG. 8. FIG. 9 illustrates that tension springs 905 help secure the clip 410 when the clip 410 is disposed in the retainer 505.

As shown in FIG. 10, the pivot arm 615 includes a nose 1010. A toothed bar 1015 is disposed on a surface of the angle member 210. The ratcheting feature of movable jaw 205 is enabled by operation of the torsion spring 1005 on the pivot arm 615, and by communication between the nose 1010 (which acts as a pawl) and the toothed bar 1015.

Figure 11:
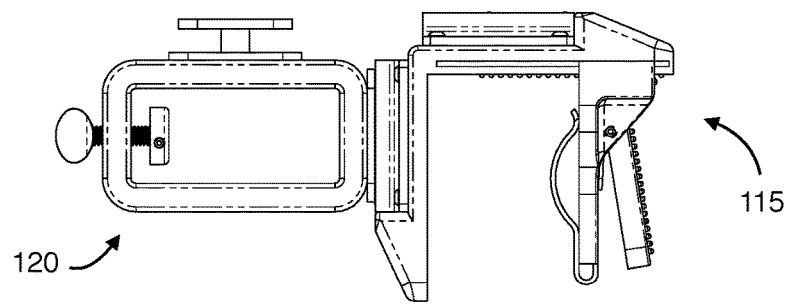
FIG. 11 is a side view of a clamping system, according to an embodiment of the invention.
Figure 12:
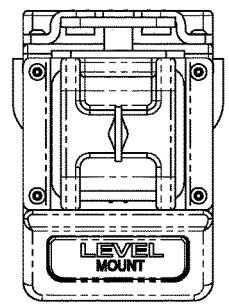
FIG. 12 is a first end view of the clamping system in FIG. 11.
Figure 13:
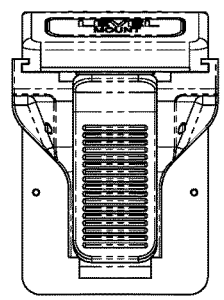
FIG. 13 is a second end view of the clamping system in FIG. 11.
Figure 14:
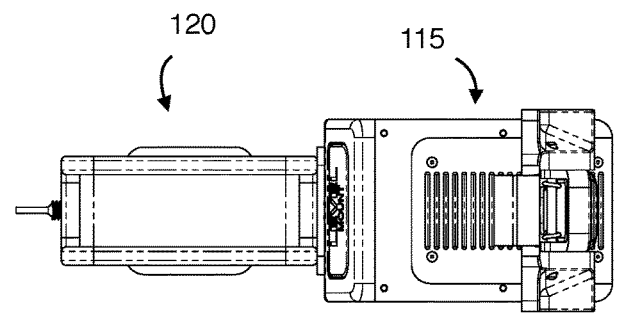
FIG. 14 is a bottom view of the clamping system in FIG. 11.

FIG. 11 is a side view of a clamping system, according to an embodiment of the invention. FIG. 12 is a first end view of the clamping system in FIG. 11; FIG. 13 is a second end view of the clamping system in FIG. 11; FIG. 14 is a bottom view of the clamping system in FIG. 11.

Figure 15:
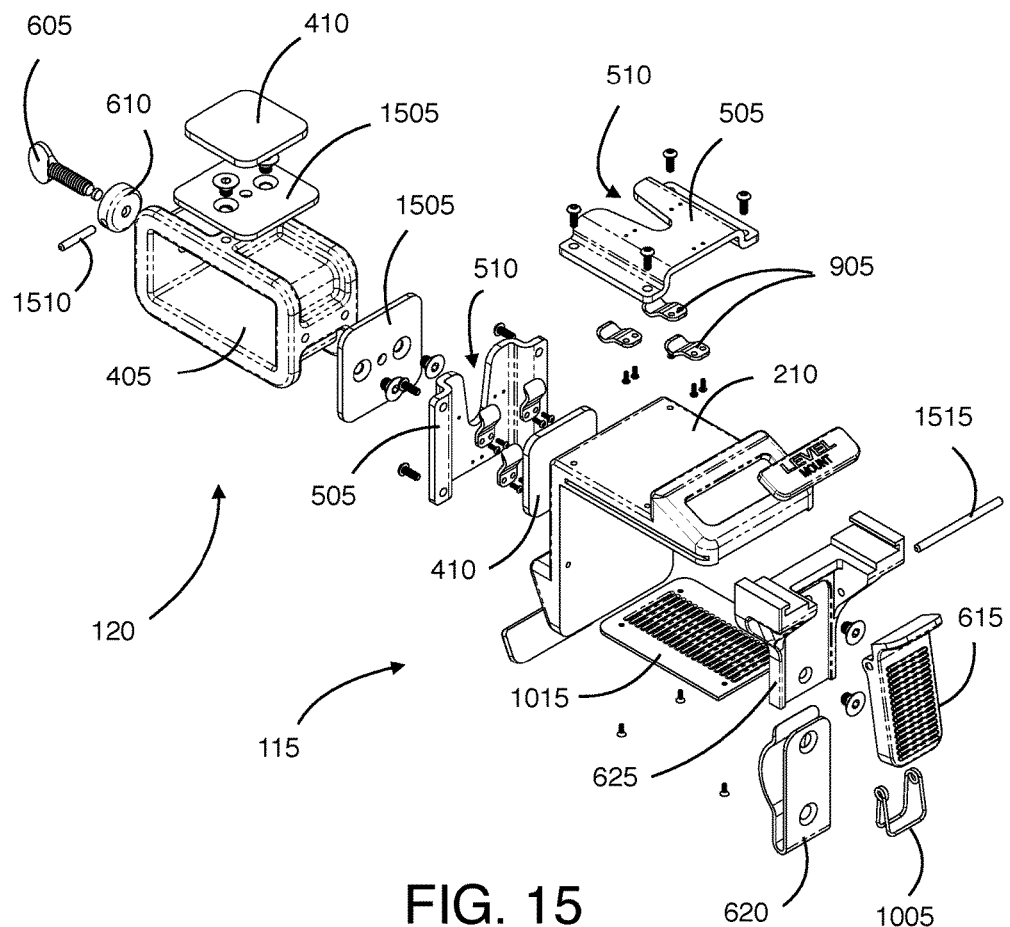
FIG. 15 is an exploded view of a clamping system, according to an embodiment of the invention.

FIG. 15 is an exploded view of a clamping system, according to an embodiment of the invention. FIG. 15 more clearly illustrates certain features not discussed above. In particular, FIG. 15 shows two clip bases 1505 that serve as foundations for corresponding clips 410. In embodiments of the invention, the post 630 of the clip 410 threads into a hole in the clip base 1505. FIG. 15 also illustrates a set pin 1510 that is used to couple the foot 610 to the thumb screw 605, and a pivot pin 1515 that facilitates a pivoting connection between the pivot arm 615 and the plate 625.

Exemplary Applications

FIGS. 16-25 illustrate several applications for one or more of the flexible clamping systems illustrated in FIGS. 1-15. For best accuracy, the use of two or more clamping systems is preferable for most applications. Physical dimensions of the vise 115, level holder 120 and/or level 105 could be varied according to application needs.

Figure 16:
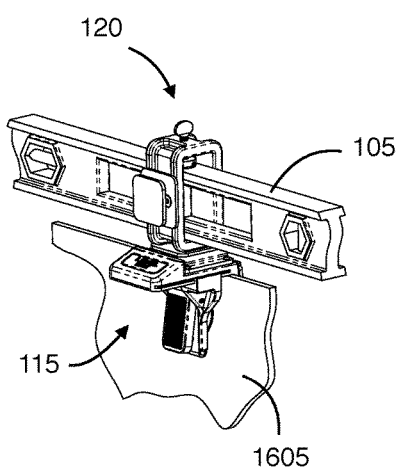
FIG. 16 is a perspective view of a clamping system in use, according to an embodiment of the invention.
Figure 17:
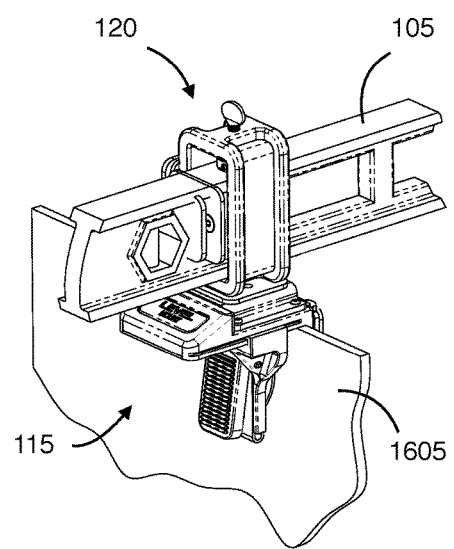
FIG. 17 is a perspective view of a clamping system in use, according to an embodiment of the invention.

FIGS. 16 and 17 each show a single clamping system (comprised of a level holder 120 and a vise 115) removably securing a level 105 to a sheet 1605. In FIG. 16, the clamping system is configured to dispose the level 105 parallel to the sheet 1605; In FIG. 17, the clamping system is reconfigured (by rotating the level holder 120 about its longitudinal axis) to dispose the level 105 perpendicular to a plane of the sheet 1605.

Figure 18:
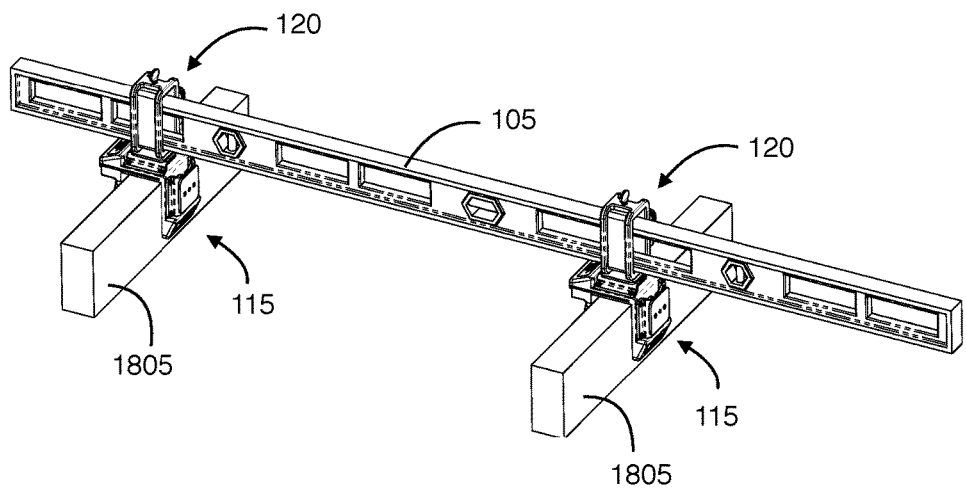
FIG. 18 is a perspective view of a pair of clamping systems in use, according to an embodiment of the invention.
Figure 19:
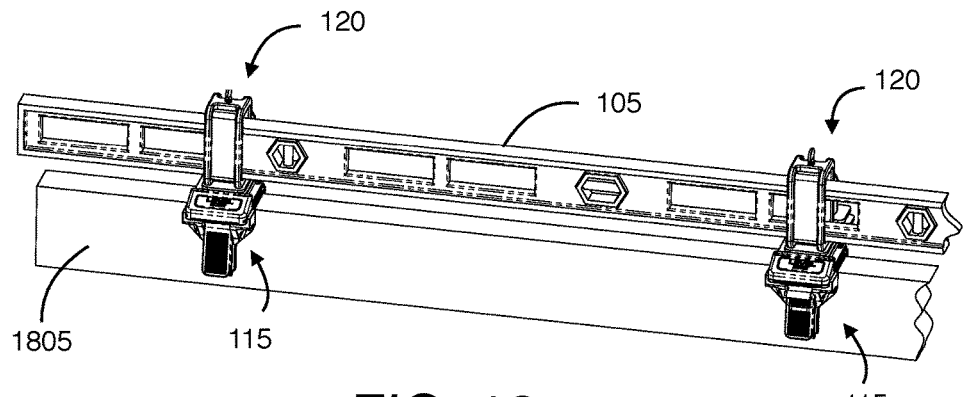
FIG. 19 is a perspective view of a pair of clamping systems in use, according to an embodiment of the invention.

FIGS. 18 and 19 each illustrate an application for a pair of clamping systems. In FIG. 18, the pair of clamping systems are configured to secure the level 105 across a pair of floor joists 1805. The pair of floor joists 1805 are disposed in parallel with respect to each other. In FIG. 19, the pair of clamping systems are configured to secure the level 105 along a top surface of a single floor joist 1805. In such applications, it may be possible to adjust the vises 115 for a light grip without the need to readjust the vises 115 when repositioning the clamping systems to another pair of floor joists 1805.

Figure 20:
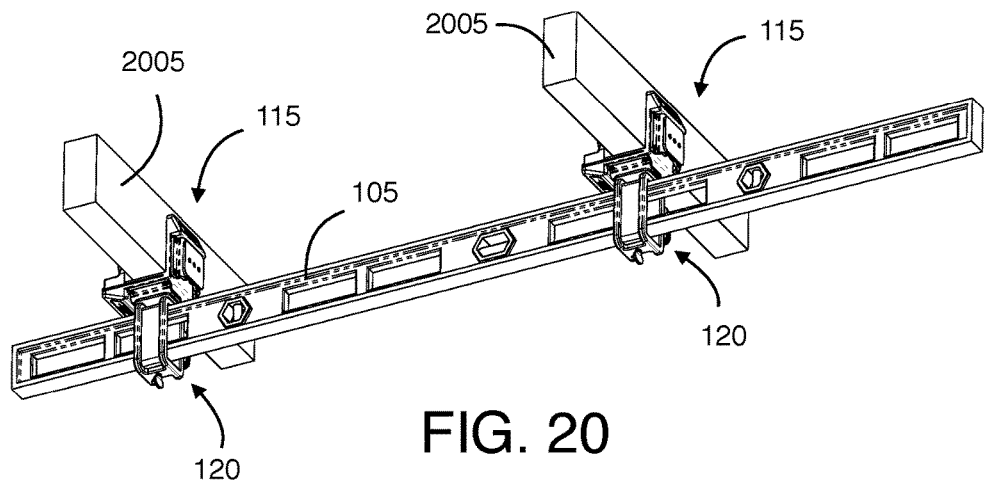
FIG. 20 is a perspective view of a pair of clamping systems in use, according to an embodiment of the invention.
Figure 21:
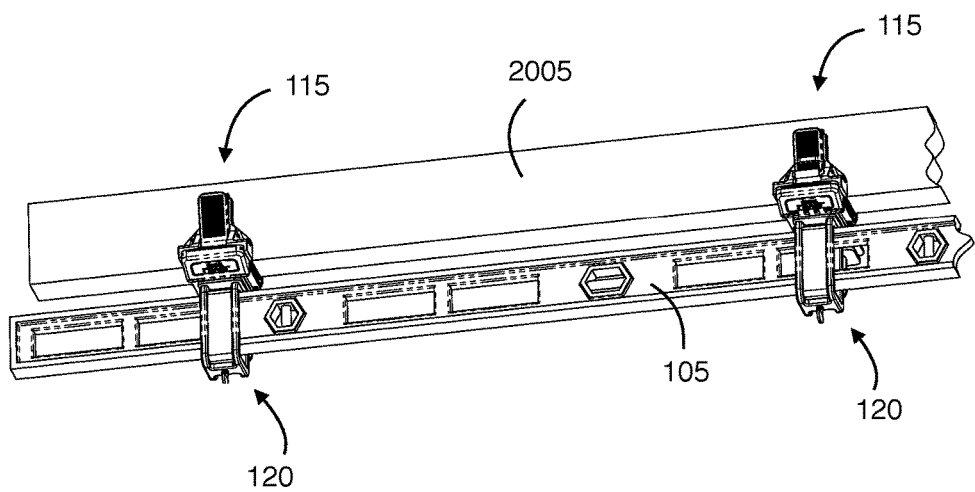
FIG. 21 is a perspective view of a pair of clamping systems in use, according to an embodiment of the invention.

The clamping system configurations illustrated in FIGS. 20 and 21 are the same as those shown in FIGS. 18 and 19, respectively. But FIGS. 20 and 21 illustrate applications in which the clamping systems are used to secure the level 105 to ceiling joists 2005.

Figure 22:
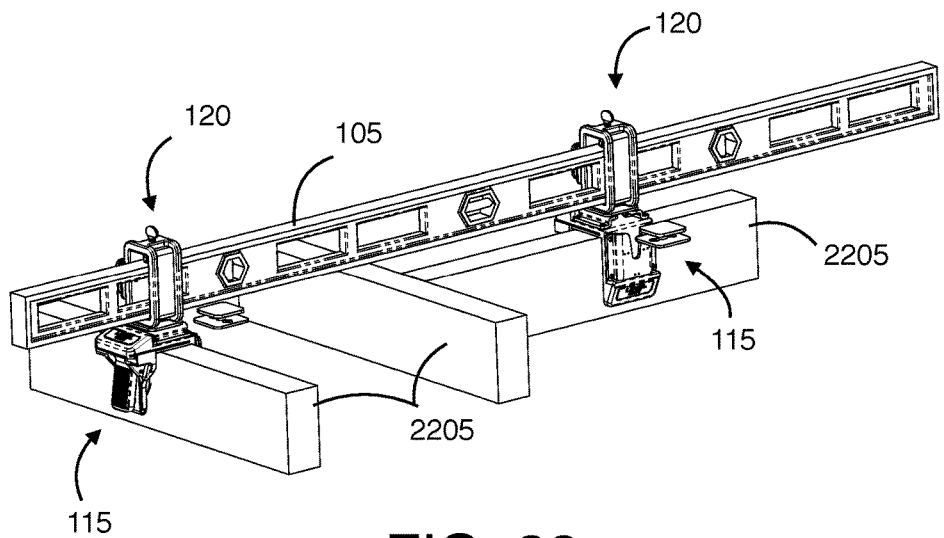
FIG. 22 is a perspective view of a pair of clamping systems in use, according to an embodiment of the invention.
Figure 23:
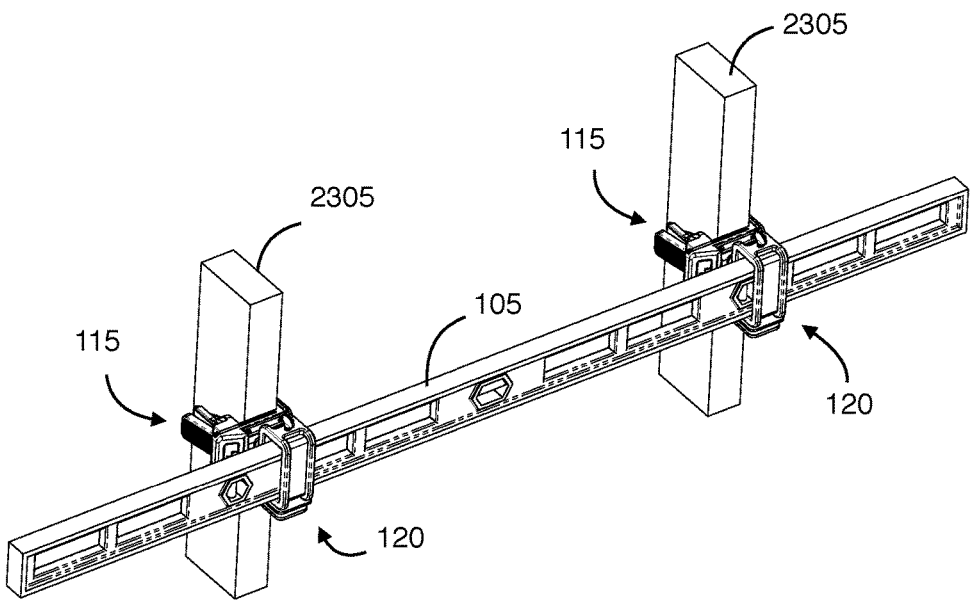
FIG. 23 is a perspective view of a pair of clamping systems in use, according to an embodiment of the invention.
Figure 24:
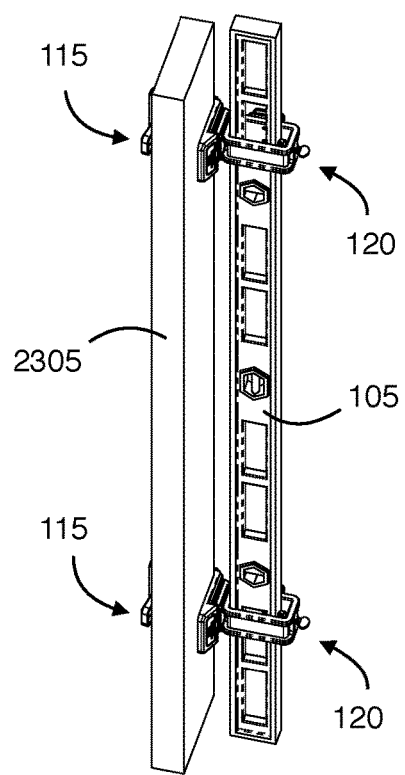
FIG. 24 is a perspective view of a pair of clamping systems in use, according to an embodiment of the invention.
Figure 25:
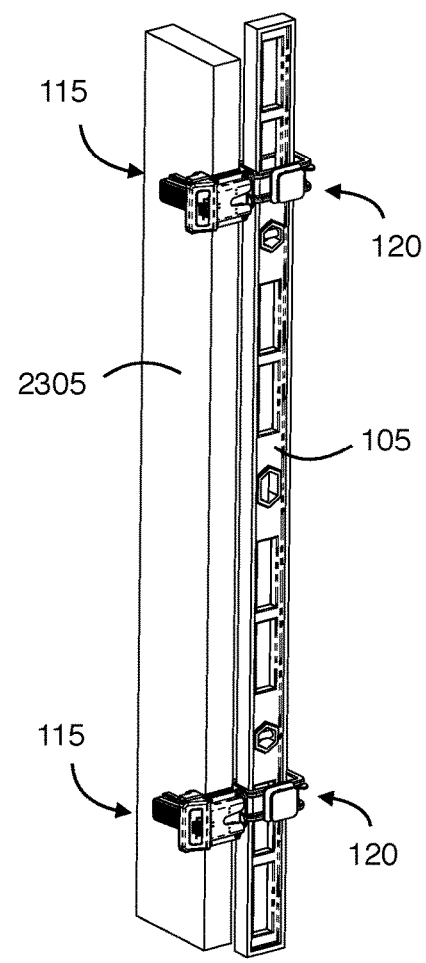
FIG. 25 is a perspective view of a pair of clamping systems in use, according to an embodiment of the invention.

FIGS. 22-25 each present an additional application for a pair of clamping systems. In FIG. 22, the clamping system are configured differently to secure the level 105 to beams 2205 that extend in perpendicular directions. FIGS. 23-25 show alternatives for securing the level 105 to one or more studs 2305.

Many other applications for the disclosed clamping system are possible. For example, other applications are possible using one, two, or more than two clamping systems. In addition, the sheet 1605, floor joist 1805, ceiling joist 2005, beam 2205, and stud 2305 can each be considered a species of structural member 110. The disclosed clamping system could be used with shelving, stairs, railings, fence posts, pipes, and many other structures not illustrated in FIGS. 16-25.

SUMMARY

Embodiments of the invention thus provide a flexible system for temporarily securing a level to a sheet, joist, stud, or other structural member. Advantageously, embodiments of the invention can improve the efficiency of carpenters or other tradespersons.

Those skilled in the art can readily recognize that numerous variations and substitutions may be made in the invention, its use and its configuration to achieve substantially the same results as achieved by the embodiments described herein. Features disclosed in this specification could be combined in ways not expressly illustrated or discussed. For example, the drawings do not illustrate all possible configurations for assembling a vise 115 to a level holder 120. This specification does not disclose all possible applications for one or more clamping systems. Moreover, the clamping system described herein could be used with a level that differs from the one described and illustrated herein. Accordingly, there is no intention to limit the invention to the disclosed exemplary forms. Many variations, modifications and alternative constructions fall within the scope and spirit of the disclosed invention.

I claim:

1. A clamping system for use with a level, the clamping system comprising:
   a level holder having a 4-side sleeve, a first clip being disposed on a first middle side of the sleeve and a second clip being disposed on a second bottom side of the sleeve, the first middle side of the sleeve being orthogonal to the second bottom side of the sleeve; and
   a vise having an angle member coupled to a movable jaw, a first receiver being disposed on a first top side of the angle member and a second receiver being disposed on a second middle side of the angle member, the first top side of the angle member being orthogonal to the second middle side of the angle member, each of the first and second clips configured to cooperate with each of the first and second receivers such that the level holder can be removably connected to the vise using a selected one of the first and seconds clips and a selected one of the first and second receivers;
   wherein the first top side of the angle member includes a toothed bar to cooperate with the movable jaw, the second middle side of the angle member being a fixed jaw, a gripping surface of the movable jaw facing a gripping surface of the fixed jaw.

2. The clamping system of claim 1, wherein the level holder includes:
   a threaded through-hole disposed in a third side of the sleeve; and
   a thumb screw disposed in the threaded through-hole, a portion of the level disposed inside the sleeve and the thumb screw in communication with the level when the clamping system is in use.

3. The clamping system of claim 2, the thumb screw having a head end and a terminal end, a foot being disposed on the terminal end to facilitate the communication with the level when the clamping system is in use.

4. The clamping system of claim 1, wherein a flat spring is disposed on the gripping surface of the movable jaw.

5. The clamping system of claim 1, wherein a flat spring is disposed on the gripping surface of the fixed jaw.

6. The clamping system of claim 1, wherein the movable jaw includes:
   a plate having the gripping surface of the movable jaw;
   a pivot arm movably connected to the plate with a pivot pin; and
   a torsion spring in communication with the pivot arm and the plate nose of the pivot arm cooperating with the toothed bar to provide ratcheting adjustment of the movable jaw.

7. The clamping system of claim 1, where each of the first and second receivers includes at least one tension spring.

8. The clamping system of claim 1, wherein at least two clamping system configurations are possible using the selected one of the first and second clips and the selected one of the first and second receivers, the at least two clamping system configurations being distinguished by a rotational displacement of the level holder with respect to the vise.

* * * * *